US012786872B2

(12) United States Patent
Huang

(10) Patent No.: US 12,786,872 B2
(45) Date of Patent: Nov. 3, 2026

(54) STATION MULTI-LINK DEVICE AND OPERATION METHOD THEREOF

(71) Applicant: Realtek Semiconductor Corp., HsinChu (TW)

(72) Inventor: Hsin-Ta Huang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 18/638,649

(22) Filed: Apr. 17, 2024

(65) Prior Publication Data

US 2024/0373355 A1 Nov. 7, 2024

(30) Foreign Application Priority Data

May 5, 2023 (TW) ................................ 112116788

(51) Int. Cl.
*H04W 52/02* (2009.01)
*H04W 8/22* (2009.01)

(52) U.S. Cl.
CPC ......... *H04W 52/0219* (2013.01); *H04W 8/22* (2013.01); *H04W 52/0274* (2013.01)

(58) Field of Classification Search
CPC ................................................ H04W 52/0219
See application file for complete search history.

(56) References Cited

U.S. PATENT DOCUMENTS

| | | | | |
|---|---|---|---|---|
| 11,690,012 | B2 * | 6/2023 | Naribole | H04W 52/0209 455/572 |
| 2018/0206190 | A1 * | 7/2018 | Cherian | H04L 1/1621 |
| 2019/0007904 | A1 * | 1/2019 | Asterjadhi | H04W 52/0216 |
| 2021/0058868 | A1 | 2/2021 | Cariou | |
| 2022/0124857 | A1 | 4/2022 | Patil | |
| 2026/0089637 | A1 * | 3/2026 | Mozaffari | H04W 52/0216 |

* cited by examiner

*Primary Examiner* — Jeffrey M Rutkowski
(74) *Attorney, Agent, or Firm* — Winston Hsu

(57) ABSTRACT

A method of operating a station multi-link device (STA MLD). The STA MLD includes N radio chains, M antennas and a processor. N and M are positive integers, M≥N. The processor is coupled to the N radio chains. The method includes the processor setting the STA MLD to a multi-link multi-radio (MLMR) mode, the processor setting each radio chain as performing data transmissions via the M antennas, and the processor setting a power save mode of at least one radio chain to a doze state. The method further includes the processor allocating the M antennas to the N radio chains according to an application scenario, and the processor updating the N power save modes of the N radio chains according to the application scenario.

15 Claims, 4 Drawing Sheets

STATION MULTI-LINK DEVICE AND OPERATION METHOD THEREOF

BACKGROUND OF THE INVENTION

1. Field of the Invention

The present invention relates to wireless communication, and more particularly to a multi-link device and its operation method.

2. Description of the Prior Art

The IEEE 802.11BE communication protocol is a new generation of Wi-Fi 7 wireless access technology that supports a multi-link multi-radio (MLMR) mode and a multi-link single-radio (MLSR) mode. In the MLSR mode, only one link can transmit at the same time, so the transmitter/receiver (Tx/Rx) capability of the link can be set to the maximum throughput capability of the Wi-Fi device. In the MLMR mode, all links can transmit at the same time, so the Tx/Rx capabilities of each link must satisfy the minimum throughput capability of each link.

In the related technologies, when a Wi-Fi device needs a high throughput capability, the Wi-Fi device selects the MLSR mode and sets the Tx/Rx capability of a link to the maximum throughput capability to meet high throughput requirements. When the Wi-Fi device needs a high stability capability, the Wi-Fi device selects the MLMR mode and sets the Tx/Rx capability of each link to the minimum throughput capability to maintain stability. When the needs are switched between high throughput and high stability, the Wi-Fi device will switch between the MLSR mode and the MLMR mode. However, switching the transmission mode would result in disconnection and reconnection, leading to poor user experience.

SUMMARY OF THE INVENTION

An embodiment provides a method of operating a station multi-link device (STA MLD). The STA MLD includes N radio chains, M antennas and a processor. N and M are positive integers, M≥N. The processor is coupled to the N radio chains. The method includes the processor setting the STA MLD to a multi-link multi-radio (MLMR) mode, the processor setting each radio chain as performing data transmissions via the M antennas, the processor setting a power save mode of at least one radio chain to a doze state, the processor allocating the M antennas to the N radio chains according to an application scenario, and the processor updating the N power save modes of the N radio chains according to the application scenario.

Another embodiment provides another station multi-link device, including N radio chains, M antennas and a processor. N and M are positive integers, M≥N. The M antennas and the processor are coupled to the N radio chains. The processor sets the STA MLD to a multi-link multi-radio mode, sets each radio chain as performing data transmissions via the M antennas, sets a power save mode of at least one radio chain to a doze state, allocates the M antennas to the N radio chains according to an application scenario, and updates the N power save modes of the N radio chains according to the application scenario.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
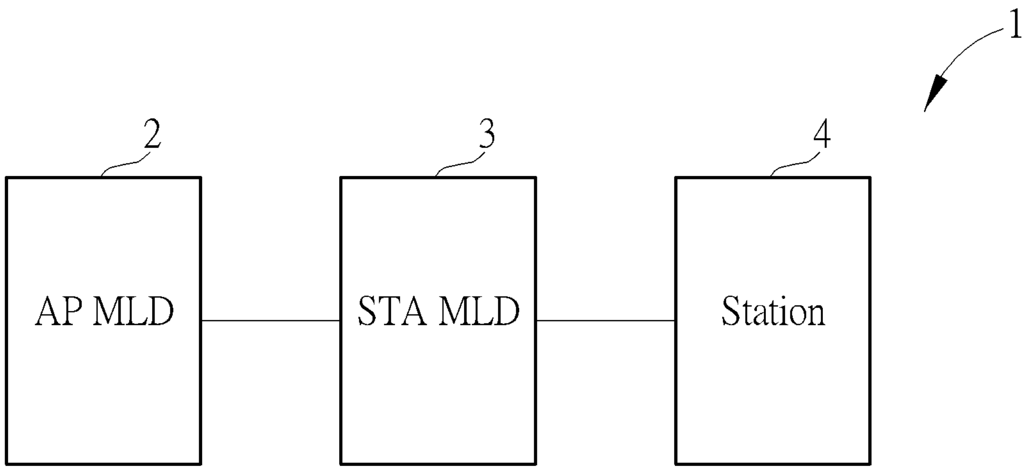
FIG. 1 is a schematic diagram of a multi-link communication system according to an embodiment of the invention.

FIG. 1 is a schematic diagram of a multi-link communication system 1 according to an embodiment of the invention. The multi-link communication system 1 can support IEEE 802.11 standard such as IEEE 802.11BE standard, so as to realize multi-link transmissions in a Wi-Fi network and/or a Wi-Fi Direct network. The multi-link multi-radio (MLMR) protocol in the IEEE 802.11BE standard may be incorporated into the operation of each device in the Wi-Fi network and/or the Wi-Fi Direct to enable more efficient communications between the devices while maintaining the stability of each device, ensuring the transmission quality, and enhancing the transmission performance and user experience.

The multi-link communication system 1 may include an access point multi-link device (AP MLD) 2, a station multi-link device (STA MLD) 3 and a station 4. The STA MLD 3 may also be referred to as a non-AP MLD. The AP MLD 2 can be coupled to the STA MLD 3, and the STA MLD 3 can be coupled to the station 4. The station 4 may be a single-link station or a station multi-link device. Wi-Fi transmission can be performed between the AP MLD 2 and the STA MLD 3, and peer-to-peer (P2P) transmission can be performed between the STA MLD 3 and the station 4. When performing Wi-Fi transmission, the AP MLD 2 can perform uplink transmission or downlink transmission to the STA MLD 3 via a single link or multiple links. When performing point-to-point transmission, one of the STA MLD 3 and the station 4 can be used as a group owner (GO), and the other can be used as a P2P client. For example, the STA MLD 3 can be used as a group owner, and the station 4 can be used as a P2P client. The group owner can create and manage the Wi-Fi direct network and coordinate data transfers. On the other hand, the P2P client can receive data from and transmit data to the group owner. Therefore, the STA MLD 3 plays the role of the STA MLD and group owner at the same time.

Since the STA MLD 3 can play multiple roles in the multi-link communication system 1, the application scenario of the STA MLD 3 may change at any time. For example, the application scenario of the STA MLD 3 may require high throughput at the moment (such as watching videos or browsing the web), low latency/high stability at the next moment (such as playing online games), and requires high throughput and low latency simultaneously at another time (such as playing Miracast video). In the scenarios requiring the high throughput capabilities, the STA MLD 3 can transmit via a link with a better wireless environment. For the scenarios requiring the low latency capabilities, the STA MLD 3 can perform multi-link transmission. In the scenarios requiring both the high throughput capabilities and the low latency capabilities, the STA MLD 3 can perform multi-link transmission and allocate available wireless resources (such as the antennas and the radio chains) according to the transmission data.

In some embodiments, the STA MLD 3 can select the MLMR mode when establishing a connection, so that all links can operate simultaneously and each link provides the maximum transmitter/receiver (transmitter/receiver, Tx/Rx) capability. The maximum Tx/Rx capability may be related to the total number of antennas of the STA MLD 3, the Tx capability may be the number of antennas used for transmitting data, and the Rx capability may be the number of antennas used for receiving data. For example, the total number of the antennas may be 2, and the maximum Tx/Rx capability may be 2×2, which means that 2 antennas are used to transmit data and 2 antennas are used to receive data. The STA MLD 3 can select the MLMR mode when establishing the connection, and set the transmission via the first link and the second link. The Tx/Rx capability of the first link can be 2×2, and the Tx/Rx capability of the second link can be 2×2. Then, the STA MLD 3 can adjust the power save mode and Tx/Rx capability of each link according to the application scenario, taking into account the needs of various application scenarios, and achieve a high stability and high throughput connection while maintaining the MLMR mode without disconnection, and enhancing the transmission performance and user experience.

Figure 2:
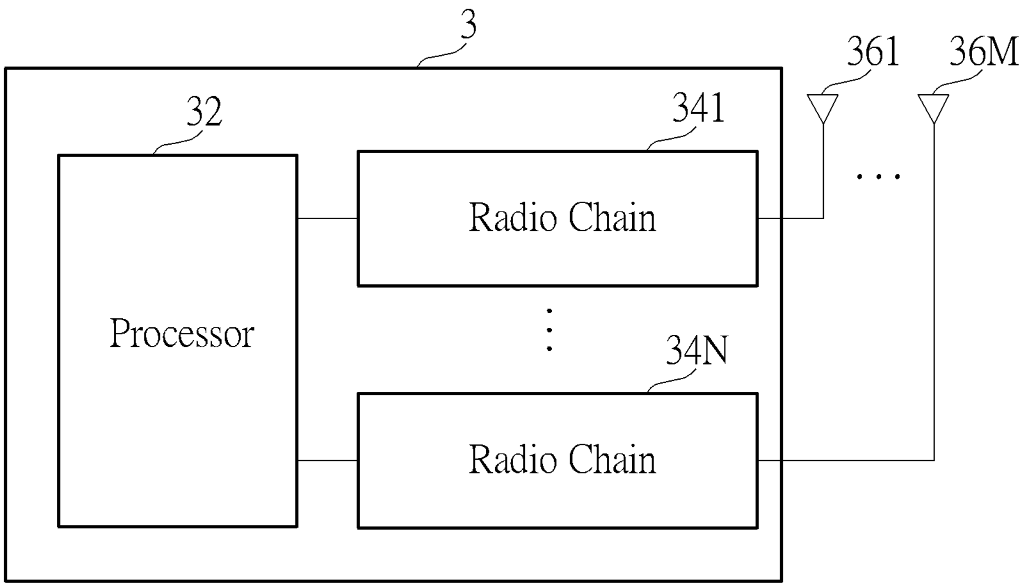
FIG. 2 is a block diagram of the station multi-link device in FIG. 1.

FIG. 2 is a block diagram of the STA MLD 3. The STA MLD 3 includes radio chains 341 to 34N, antennas 361 to 36M, and a processor 32, where N and M are positive integers, M≥N. The antennas 361 to 36M and the processor 32 are coupled to the radio chains 341 to 34N. The number N of radio chains 341 to 34N and the number M of the antennas 361 to 36M may be the same or different. For example, if N=2, M=2, then the STA MLD 3 includes radio chains 341-342 and antennas 361-362. In some embodiments, the processor 32 may be implemented as a controller, a digital signal processor (DSP) or an Application Specific Integrated Circuit (ASIC), etc.

Each radio chain may include a plurality of components or circuits for wireless transmission on the corresponding link. The components or circuits may include a transceiver circuit (i.e., transmitting circuit and receiving circuit), a digital-to-analog converter, an analog-to-digital converter, a baseband processor. For example, the radio chain 341 may include a transceiver circuit, a digital-to-analog converter, an analog-to-digital converter, and a baseband processor for wireless transmission on the first link. The radio chain a 342 may include transceiver circuit, a digital-to-analog converter, an analog-to-digital converter, and a baseband processor for wireless transmission on the second link. The radio chain 341 can convert the data from the processor 32 into a radio frequency (RF) signal and transmit the RF signal via the first link to a set of antennas of the antennas 361 to 36M, and convert the RF signal received by the set of antennas from the first link to data for the processor 32 to process the data. The radio chain 342 can convert the data from the processor 32 into an RF signal and transmit the RF signal via the second link to a set of antennas of the antennas 361 to 36M, and convert the RF signal received by the set of antennas via the second link to data the processor 32 to process the data. Using the radio chain 341 and the radio chain 342 to process the RF signals of the first link and the second link respectively can ensure the transmission quality and improve system efficiency. The first link and the second link can be selected from the spectrum supported by the STA MLD 3. For example, the STA MLD 3 can support a 2.4G and a 5G spectrum, the first link can operate in the 2.4 GHZ frequency band, and the second link can operate in the 5 GHz frequency band.

The processor 32 can set the STA MLD 3 to the MLMR mode and set each radio chain to transmit or receive data via the antennas 361 to 36M when performing a Wi-Fi association, and make at least one of the radio chains 341 to 34N enter a doze state. In one embodiment, assume that the STA MLD 3 is connected to the AP MLD 2 via the radio chain 341, during the connection process, the radio chains 342 to 34N are preset to be in the doze state for the AP MLD 2, so the radio chains 342 to 34N can be set to the doze state. Before data transmission, the processor 32 can adjust the power save mode and the Tx/Rx capability of each radio chain according to the application scenario. The power save mode can be a doze state or an awake state. In the doze state, the STA MLD 3 can only maintain the basic operation without transmitting data, thereby reducing power consumption. In the awake state, the STA MLD 3 can transmit data to the AP MLD 2 and/or the station 4. In some embodiments, the processor 32 can adjust the Tx/Rx capabilities of the radio chains 341 to 34N by assigning the antennas 361 to 36M to the radio chains 341 to 34N. For example, if M=2, assigning the antennas 361 and 362 to the radio chain 341 may be equivalent to setting the radio chain 341 to a maximum Tx/Rx capability (2×2), and assigning the antennas 361 or 362 to the radio chain 341 may be equivalent to setting the Tx/Rx capability of the radio chain 341 to 1×1. By adjusting the Tx/Rx capability and the power save mode of each radio chain in the MLMR mode, the STA MLD 3 can use the radio chains 341 to 34N for transmission in the latency-oriented scenario, use one of the radio chains 341 to 34N for transmission in the throughput-oriented scenario, and allocate the antennas 361 to 36M to the radio chains 341 to 34N according to the transmission data in the application scenario with both latency capability orientation and throughput capability orientation and use the radio chains 341 to 34N for transmission. In this way, the needs of various application scenarios can be taken into account, and the high stability and high throughput connection can be achieved while maintaining the MLMR mode without disconnection, so as to enhance the transmission performance and user experience.

Figure 3:
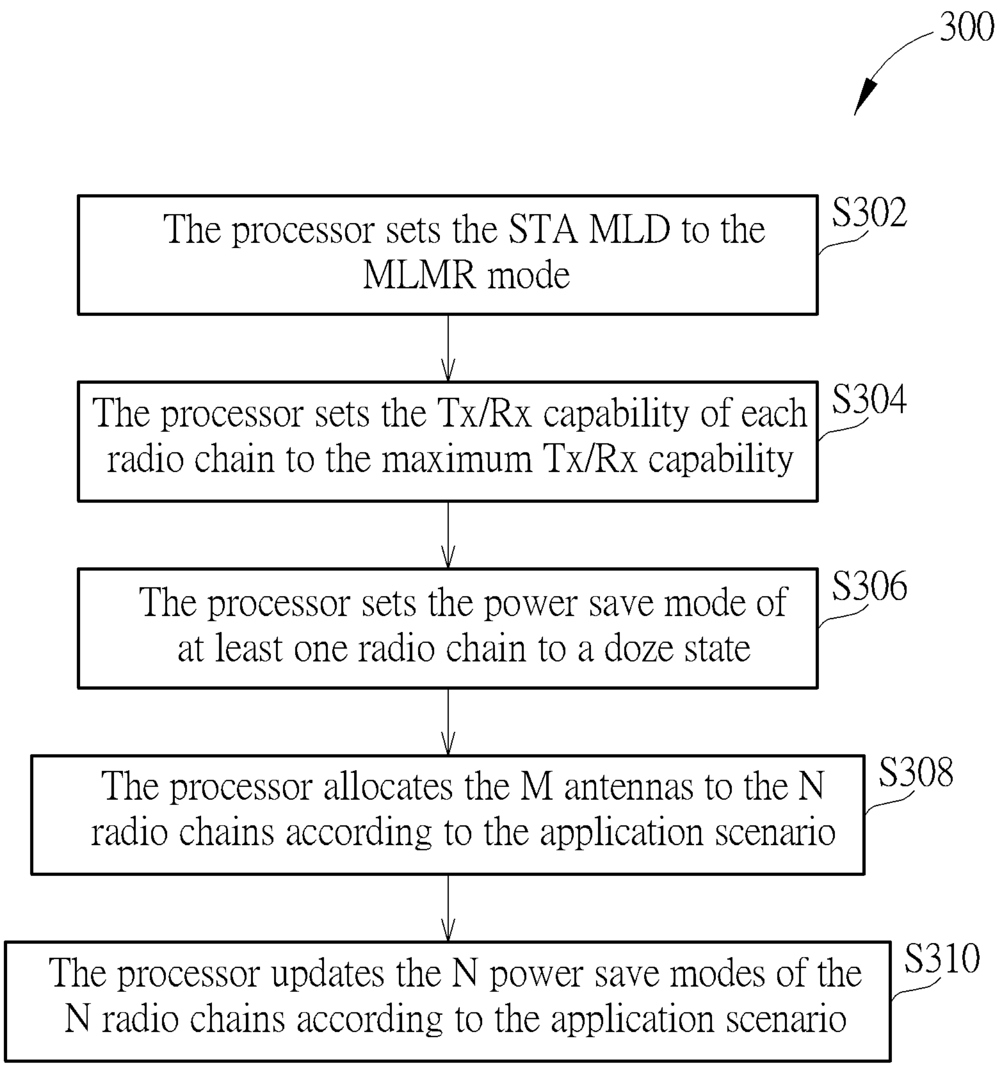
FIG. 3 is a flowchart of an operation method of the station multi-link device in FIG. 1.

FIG. 3 is a flowchart of an operation method 300 of the STA MLD 3, applicable to the processor 32. The operation method 300 includes Steps S302 to S310, Steps S302 to S306 are used to perform initial transmission settings for the STA MLD 3, and Steps S308 and S310 are used to adjust the transmission settings according to the application scenario. Any reasonable technical changes or step adjustments fall within the scope of the disclosure of the present invention. Steps S302 to S310 are explained as follows:

Step S302: The processor 32 sets the STA MLD 3 to the MLMR mode;

Step S304: the processor 32 sets the Tx/Rx capability of each radio chain to the maximum Tx/Rx capability, that is, each radio chain is set to transmit or receive data via the antennas 361 to 36M;

Step S306: the processor 32 sets the power save mode of at least one radio chain to a doze state;

Step S308: the processor 32 allocates the antennas 361 to 36M to the radio chains 341 to 34N according to the application scenario;

Step S310: the processor 32 updates the N power save modes of the radio chains 341 to 34N according to the application scenario.

When the STA MLD 3 establishes a Wi-Fi association to the AP MLD 2, the STA MLD 3 enables the MLMR mode (Step S302) and sets the Tx/Rx capability of each radio chain to the maximum Tx/Rx capability (Step S304). In some embodiments, the STA MLD 3 can simultaneously enable the MLMR mode and set the Tx/Rx capability of each radio chain to the maximum Tx/Rx capability in the management frame. In Step S306, since no transmission has been performed, the processor 32 sets the power save mode of at least one of the radio chains 341 to 34N to a doze state. The STA MLD 3 can transmit a null data frame on the corresponding link of each radio chain to set the power save mode. A null data frame contains a power save bit. If the power save bit is 1 (referred to as a null data frame null (1) in the following paragraphs), the power save mode is set to the doze state; if the power save bit is 0 (referred to as a null data frame null (0) in the following paragraphs), the power save mode is set to the awake state. In Step S306, the STA MLD 3 transmits a null data frame null (1) on at least one link to set at least one radio chain in a doze state.

Before each data transmission, the processor 32 allocates the antennas 361 to 36M to the radio chains 341 to 34N according to the application scenario (Step S308) and updates the N power save modes of the radio chains 341 to 34N according to the application scenario (Step S310). That is, the processor 32 flexibly adjusts the antenna and the radio chain to be used for each data transmission according to the application scenario. The application scenario can be a latency-oriented scenario, throughput-oriented scenario, or joint throughput-latency-oriented scenario that has both latency capability orientation and throughput capability orientation.

In some embodiments, when the application scenario is a throughput-oriented scenario, the processor 32 may select a radio chain from the radio chains 341 to 34N, set the power save mode of the selected radio chain among the radio chains 341 to 34N to the awake state, and allocate all the antennas 361 to 36M to the selected radio chain, so as to achieve the effect of the multi-link single-radio (MLSR) mode in the MLMR mode. In this embodiment, the connection of the selected radio chain is better than the connections of the other radio chains among the radio chains 341 to 34N, and except for the selected radio chain, the other radio chains are maintained in a doze state. In some embodiments, the processor 32 may determine the connection of each radio chain according to a Clear Channel Assessment (CCA) result and/or a Network Allocation Vector (NAV) of each radio chain. For example, when detecting the preamble of the data transmission and/or the channel energy exceeds a predetermined threshold, the processor 32 can determine that the connection is busy; when detecting that the preamble and/or channel energy of the data transmission does not exceed e a predetermined threshold, the processor 32 can determine that the connection is idle. In another example, when the NAV is detected to have a non-zero value, the processor 32 can determine the connection is busy; when the NAV is detected to have a zero value, the processor 32 can determine the connection is idle. The longer the connection of the radio chain is idle during the predetermined period, the better the connection is.

Figure 4:
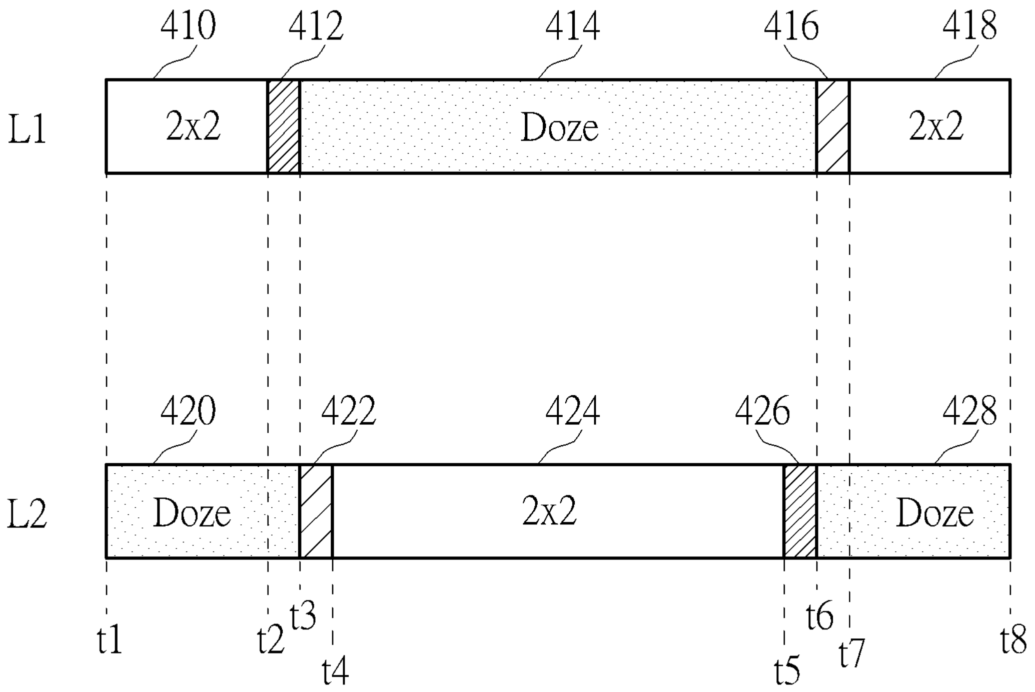
FIG. 4 is a schematic diagram of an operation method of the station multi-link device in FIG. 1 in a throughput-oriented scenario.

FIG. 4 is a schematic diagram of an operation method of the STA MLD 3 in a throughput-oriented scenario, wherein the horizontal axis is time. In the embodiment in FIG. 4, N=2, M=2, and the STA MLD 3 and the AP MLD 2 perform data transmission in a throughput-oriented scenario (such as watching a movie) through the first link L1 or the second link L2. The first link L1 corresponds to the radio chain 341, and the second link L2 corresponds to the radio chain 342.

Before time t1, the STA MLD 3 is ready to perform throughput-oriented data transmission 410, the processor 32 chooses to perform data transmission 410 on the first link L1, and the STA MLD 3 transmits a null data frame null (0) on the first link L1 to set the radio chain 341 into an awake state. The Tx/Rx capability of the radio chain 341 and the Tx/Rx capability of the radio chain 341 are the maximum Tx/Rx capability 2×2. Between time t1 and time t2, the radio chain 341 uses the maximum Tx/Rx capability 2×2 for data transmission 410, and the radio chain 342 remains in the doze state 420 without data transmission.

At time t2, the STA MLD 3 prepares to perform throughput-oriented data transmission 424, and the processor 32 chooses to perform data transmission 424 on the second link L2. Between time t2 and time t3, the STA MLD 3 transmits a null data frame null (1) 412 on the first link L1 to set the radio chain 341 into a doze state. Between time t3 and time t6, the radio chain 341 remains in the doze state 414 without data transmission. Between time t3 and time t4, the STA MLD 3 transmits a null data frame null (0) 422 on the second link L2 to set the radio chain 342 into an awake state. Between time t4 and time t5, the radio chain 342 uses the maximum Tx/Rx capability 2×2 for data transmission 424.

At time t5, the STA MLD 3 prepares to perform throughput-oriented data transmission 418 and the processor 32 chooses the first link L1 for data transmission 418. Between time t5 and time t6, the STA MLD 3 transmits a null data frame null (1) 426 on the second link L2 to set the radio chain 342 into a doze state. Between time t6 and time t8, the radio chain 342 remains in the doze state 428 without data transmission. Between time t6 and time t7, the STA MLD 3 transmits a null data frame null (0) 416 on the first link L1 to set the radio chain 342 into an awake state. Between time t7 and time t8, the radio chain 341 uses the maximum Tx/Rx capability 2×2 for data transmission 418.

In some other embodiments, when the application scenario is a latency-oriented scenario, the more links used for data transmission, the lower the latency and the more stable the data transmission, so the STA MLD 3 can use all the available radio chains for data transmission. Therefore, when the application scenario is a latency-oriented scenario, the processor 32 sets the N power save modes of the radio chains 341 to 34N to the awake state, and evenly allocates the antennas 361 to 36M to the radio chains 341 to 34N. For example, if N=2, M=2, in the latency-oriented scenario, the processor 32 can evenly allocate the antennas 361 and 362 to the radio chains 341 and 342 so that the Tx/Rx capabilities of the radio chains 341 and 342 are both 1×1.

Figure 5:
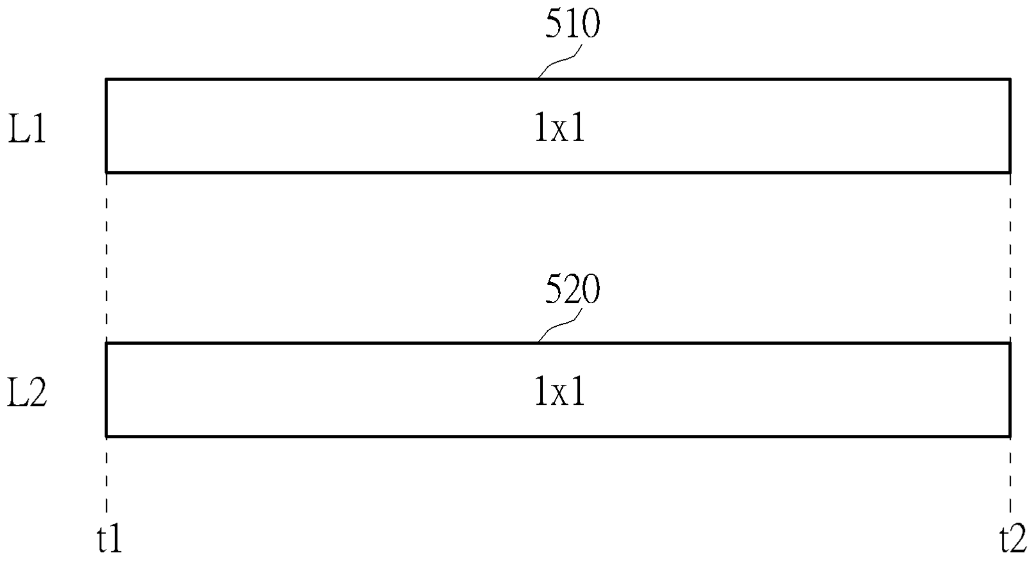
FIG. 5 is a schematic diagram of an operation method of the station multi-link device in FIG. 1 in a latency-oriented scenario.

FIG. 5 is a schematic diagram of an operation method of the STA MLD 3 in a latency-oriented scenario, wherein the horizontal axis is time. In the embodiment in FIG. 5, N=2, M=2, and the STA MLD 3 and the AP MLD 2 perform data transmission in a latency-oriented scenario (such as an online game) via the first link L1 and the second link L2. The first link L1 corresponds to the radio chain 341, and the second link L2 corresponds to the radio chain 342.

In the latency-oriented scenario, the STA MLD 3 uses all the available radio chains (the radio chain 341 and the radio chain 342) for data transmission. Before time t1, the STA MLD 3 prepares to perform latency-oriented data transmission 510 and data transmission 520, and sets the Tx/Rx capability of the radio chain 341 and the Tx/Rx capability of the radio chain 342 to 1×1, and the STA MLD 3 transmits a null data frame null (0) on the first link L1 and the second link L2 to set the radio chain 341 and the radio chain 342 into an awake state. Between time t1 and time t2, the radio chain 341 performs data transmission 510 using Tx/Rx capability 1×1, and radio chain 342 performs data transmission 520 using Tx/Rx capability 1×1.

In some other embodiments, when the application scenario is a joint throughput-latency-oriented scenario, the processor 32 sets the N power save modes of the radio chains 341 to 34N to the awake state, and allocates the antennas 361 to 36M unevenly to the radio chains 341 to 34N. For example, N=2, M=4, the processor 32 can set the power save mode of the radio chains 341 to 342 to the awake state, assign 3 of the antennas 361 to 364 to the radio chain 341, and assign the remaining 1 of the antennas 361 to 364 to the radio chain 342.

Figure 6:
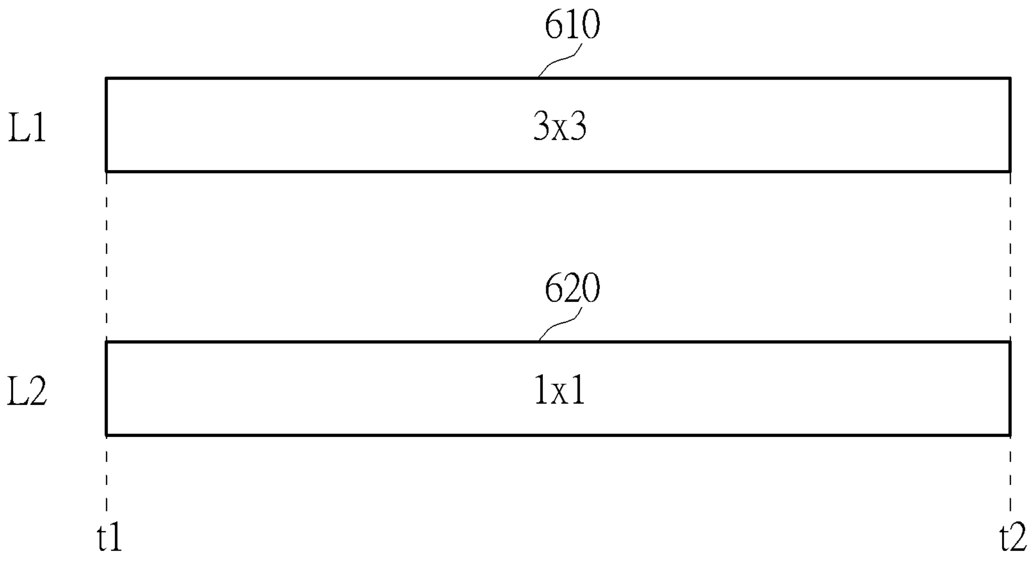
FIG. 6 is a schematic diagram of an operation method of the station multi-link device in FIG. 1 in a joint throughput-latency-oriented scenario.

FIG. 6 is a schematic diagram of an operation method of the STA MLD 3 under the joint throughput-latency-oriented scenario, wherein the horizontal axis is time. In the embodiment of FIG. 6, N=2, M=4, and the STA MLD 3 and the AP MLD 2 perform joint throughput-latency-oriented (both throughput-oriented and latency-oriented scenarios) data transmission (for example, Miracast video) via the first link L1, the STA MLD 3 and the station 4 perform throughput-oriented data transmission (such as web page browsing) via the second link L2, the first link L1 corresponds to the radio chain 341, and the second link L2 corresponds to the radio chain 342.

Before time t1, the STA MLD 3 sets the Tx/Rx capability of the radio chain 341 to 3×3, sets the Tx/Rx capability of the radio chain 342 to 1×1, and STA MLD 3 transmits a null data frame null (0) on the first link L1 and the second link L2 to set the radio chain 341 and the radio chain 342 to the awake state. Between time t1 and time t2, the radio chain S Tx/Rx capability 3×3 for data transmission 610, and the radio chain 342 uses Tx/Rx capability 1×1 for data transmission 620.

In the embodiments shown in FIG. 1 to FIG. 6, the power save mode and the Tx/Rx capability of each radio chain are adjusted according to the application scenario under MLMR, and the highly stable and high throughput connection can be achieved without disconnection, so as to enhance the transmission performance and user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of operating a station multi-link device (STA MLD), the station multi-link device comprising N radio chains, M antennas, and a processor, the processor being coupled to the N radio chains, N and M being integers greater than 1, M≥N, the method comprising:

- the processor setting the station multi-link device to a multi-link multi-radio (MLMR) mode during a network association;
- the processor configuring each radio chain to transmit or receive data via all the M antennas simultaneously during the network association;
- the processor setting a power save mode of at least one radio chain to a doze state;
- the processor allocating the M antennas to the N radio chains according to an application scenario; and
- the processor updating N power save modes of the N radio chains according to the application scenario.

2. The method of claim 1, wherein the processor updating the N power save modes of the N radio chains according to the application scenario comprises:

- when the application scenario is latency-oriented, the processor setting the N power save modes of the N radio chains to an awake state.

3. The method of claim 1, wherein the processor allocating the M antennas to the N radio chains according to the application scenario comprises:

- when the application scenario is latency-oriented, the processor evenly allocating the M antennas to the N radio chains.

4. The method of claim 1, wherein the processor updating the N power save modes of the N radio chains according to the application scenario comprises:

- when the application scenario is throughput-oriented, the processor setting a power save mode of one of the N radio chains to an awake state, wherein a connection of the radio chain is better than connections of other radio chains of the N radio chains.

5. The method of claim 1, wherein the processor allocating the M antennas to the N radio chains according to the application scenario comprises:

- when the application scenario is throughput-oriented, the processor allocating the M antennas to one of the N radio chains, wherein a connection of the radio chain is better than connections of other radio chains of the N radio chains.

6. The method of claim 1, wherein the processor updating the N power save modes of the N radio chains according to the application scenario comprises:

- when the application scenario is joint throughput-latency-oriented, the processor setting the N power save modes of the N radio chains to an awake state.

7. The method of claim 1, wherein the processor allocating the M antennas to the N radio chains according to the application scenario comprises:

- when the application scenario is joint throughput-latency-oriented, the processor unevenly allocating the M antennas to the N radio chains.

8. A station multi-link device (STA MLD) comprising:

- N radio chains;
- M antennas coupled to the N radio chains, M and N being integers greater than 1, M≥N; and
- a processor coupled to the N radio chains, and configured to set the station multi-link device to a multi-link multi-radio (MLMR) mode during a network association, configure each radio chain to transmit or receive data via all the M antennas simultaneously during the network association, set a power save mode of at least one radio chain to a doze state, allocate the M antennas to the N radio chains according to an application scenario, and update N power save modes of the N radio chains according to the application scenario.

9. The STA MLD of claim 8, wherein when the application scenario is latency-oriented, the processor is configured to set the N power save modes of the N radio chains to an awake state.

10. The STA MLD of claim 8, wherein when the application scenario is latency-oriented, the processor is configured to evenly allocate the M antennas to the N radio chains.

11. The STA MLD of claim 8, wherein when the application scenario is throughput-oriented, the processor is configured to set a power save mode of one of the N radio chains to an awake state, wherein a connection of the radio chain is better than connections of other radio chains of the N radio chains.

12. The STA MLD of claim 8, wherein when the application scenario is throughput-oriented, the processor is configured to allocate the M antennas to one of the N radio chains, wherein a connection of the radio chain is better than connections of other radio chains of the N radio chains.

13. The STA MLD of claim 8, wherein when the application scenario is joint throughput-latency-oriented, the processor is configured to set the N power save modes of the N radio chains to an awake state.

14. The STA MLD of claim 8, wherein when the application scenario is joint throughput-latency-oriented, the processor is configured to unevenly allocate the M antennas to the N radio chains.

15. A station multi-link device (STA MLD) comprising:

N radio chains;

M antennas coupled to the N radio chains, M and N being integers greater than 1, M≥N; and a processor coupled to the N radio chains, and configured to set the station multi-link device to a multi-link multi-radio (MLMR) mode during a network association, configure each radio chain to transmit or receive data via all the M antennas simultaneously during the network association, set a power save mode of at least one radio chain to a doze state, allocate the M antennas to the N radio chains according to an application scenario, and update N power save modes of the N radio chains according to the application scenario;

wherein when the application scenario is throughput-oriented, the processor is configured to allocate the M antennas to one of the N radio chains, wherein a connection of the radio chain is better than connections of other radio chains of the N radio chains.

* * * * *